Figure 1:
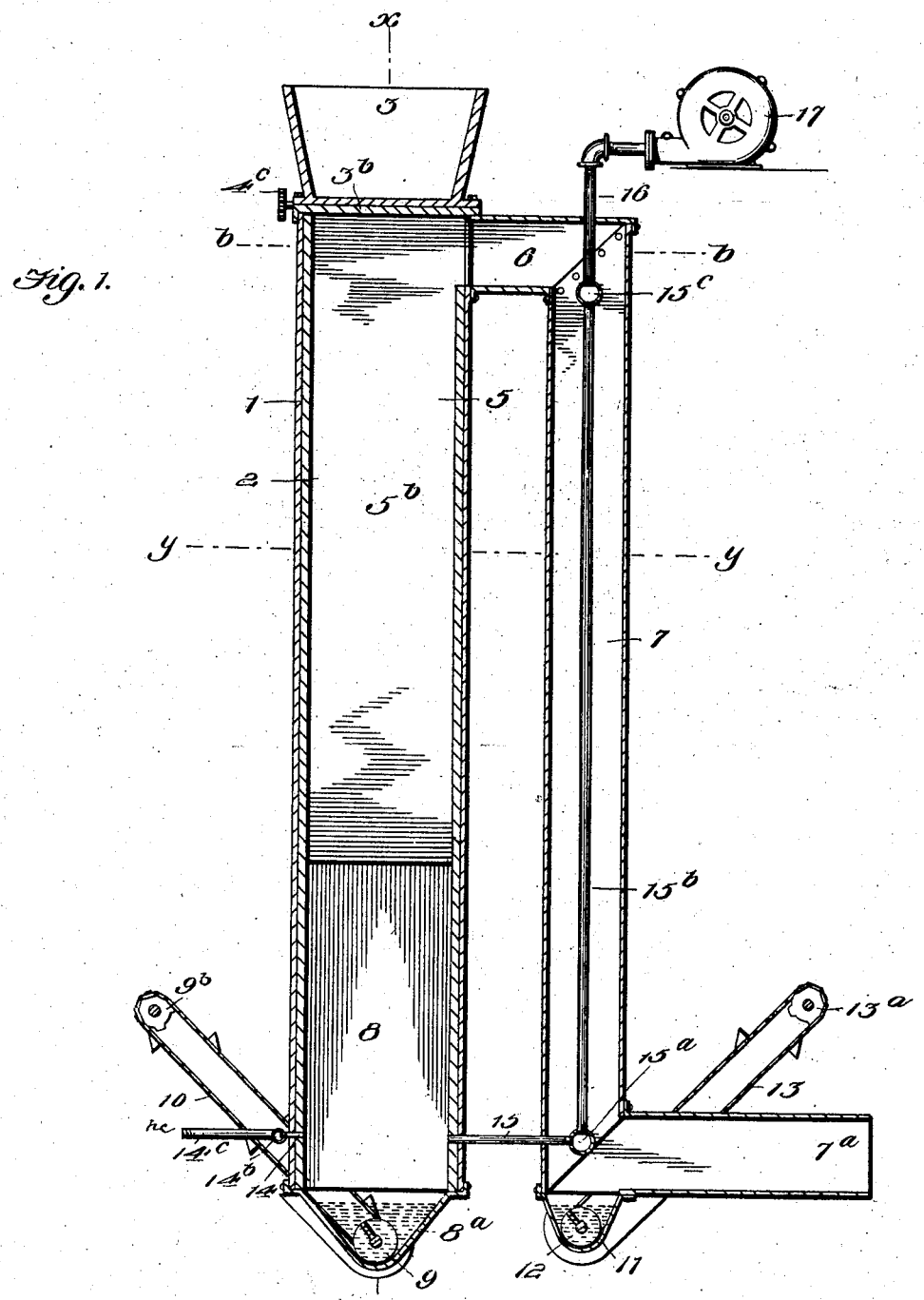

No. 760,638. PATENTED MAY 24, 1904.
W. F. MATTES.
GAS GENERATOR.
APPLICATION FILED FEB. 20, 1902.
NO MODEL. 4 SHEETS—SHEET 1.

Witnesses
Edwin Bell Frower, Jr.
J. W. MacElroy

Inventor:
William F. Mattes
by Edson Bros,
Attorneys

No. 760,638. PATENTED MAY 24, 1904.
W. F. MATTES.
GAS GENERATOR.
APPLICATION FILED FEB. 20, 1902.
NO MODEL. 4 SHEETS—SHEET 2.
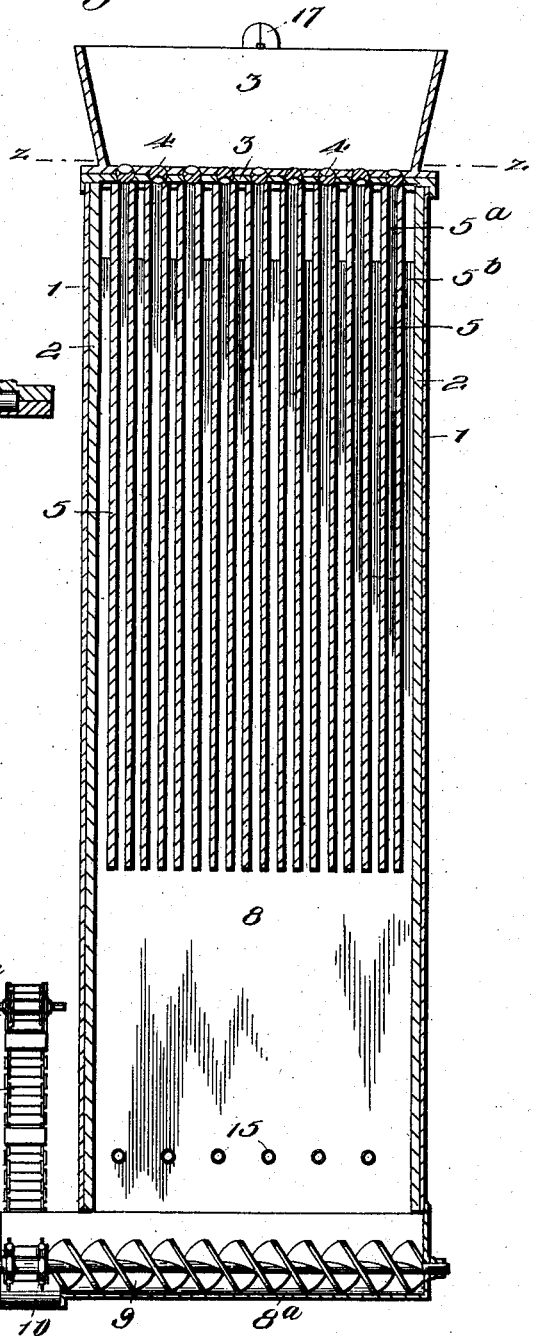
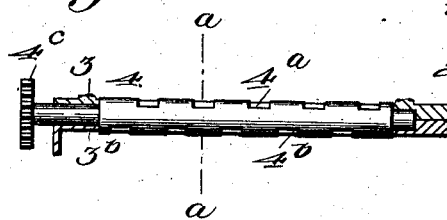
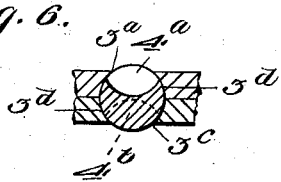
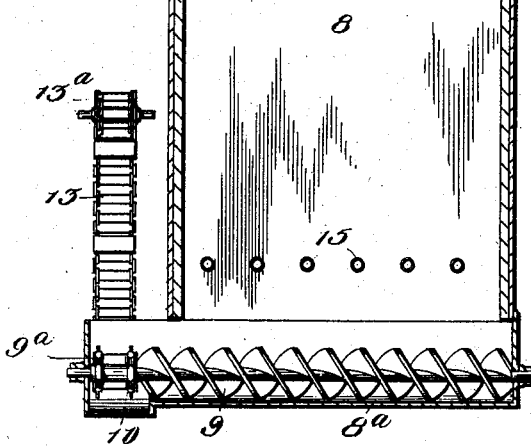

No. 760,638. PATENTED MAY 24, 1904.
W. F. MATTES.
GAS GENERATOR.
APPLICATION FILED FEB. 20, 1902.
NO MODEL. 4 SHEETS—SHEET 3.

Witnesses
Edwin B. H. Fowler, Jr.
J. W. MacElroy

Inventor:
William F. Mattes.
by Edson Bro's
Attorneys

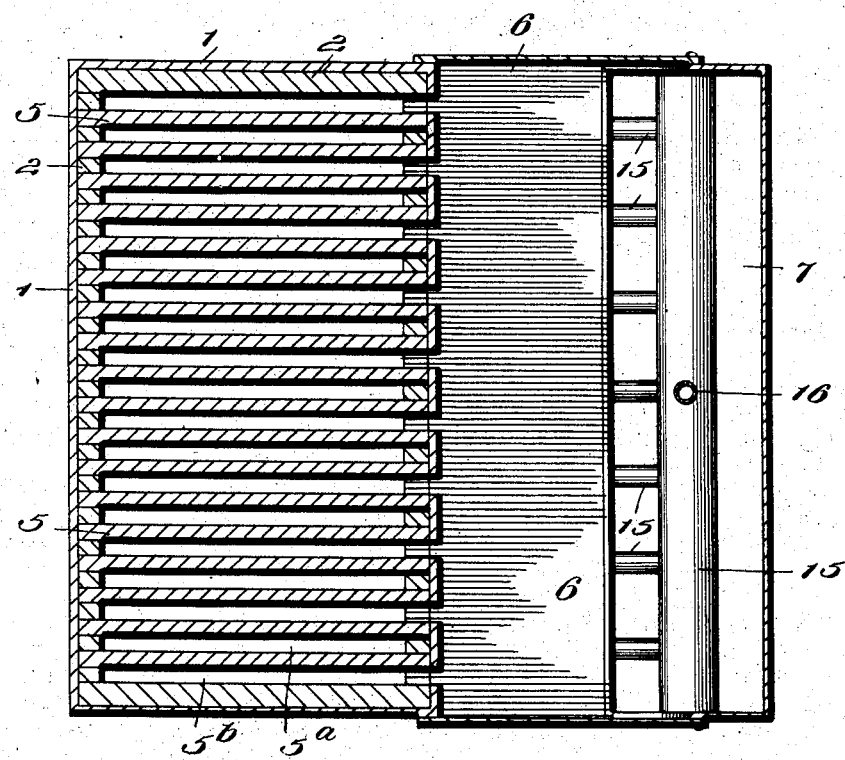

No. 760,638. Patented May 24, 1904.

UNITED STATES PATENT OFFICE.

WILLIAM F. MATTES, OF SCRANTON, PENNSYLVANIA.

GAS-GENERATOR.

SPECIFICATION forming part of Letters Patent No. 760,638, dated May 24, 1904.

Application filed February 20, 1902. Serial No. 94,968. (No model.)

*To all whom it may concern:*

Be it known that I, WILLIAM F. MATTES, a citizen of the United States, residing at Scranton, in the county of Lackawanna and State of Pennsylvania, have invented certain new and useful Improvements in Gas-Generators; and I do hereby declare the following to be a full, clear, and exact description of the invention, such as will enable others skilled in the art to which it appertains to make and use the same.

My invention relates to certain improvements in gas generators or apparatus, more especially for making what may be called "producer-gas," more particularly designed for fuel purposes.

In my process and apparatus the operation of producing or making the gas is continuous. It is not necessary to suspend the operation at intervals in order to heat up any part of the apparatus. Neither is it necessary to put it out of action every few days to clear out ashes and clinker and build a fresh fire. The fuel is fed continuously in one direction, the air-supply and resulting gases passing continuously in the opposite direction.

My invention has for its objects, first, to secure a continuous operation; second, to utilize coal-dust, which is now practically a waste product, and, third, to substitute machinery for manual labor.

The apparatus provides for regulating the feed of pulverized fuel through hot tubes or flues, by which means it is rapidly heated to a state of incandescence and is thereby brought into a condition for almost instantaneous combustion when it reaches the combustion-chamber, in which it is mingled with an opposing current of hot air. It provides for the heating of said tubes or flues and also for heating the air-supply before conveying it into the combustion-chamber, thereby greatly promoting combustion. It also provides means for the mechanical removal of the ash. The moving parts are all of such character as may be conveniently driven from a common source of power; but it is intended that each shall have independent connections by which its relative movement may be regulated.

The nature of the invention consists of the combination and arrangement of parts, including their construction, substantially as hereinafter more fully described, and particularly pointed out by the claims.

Figure 3:
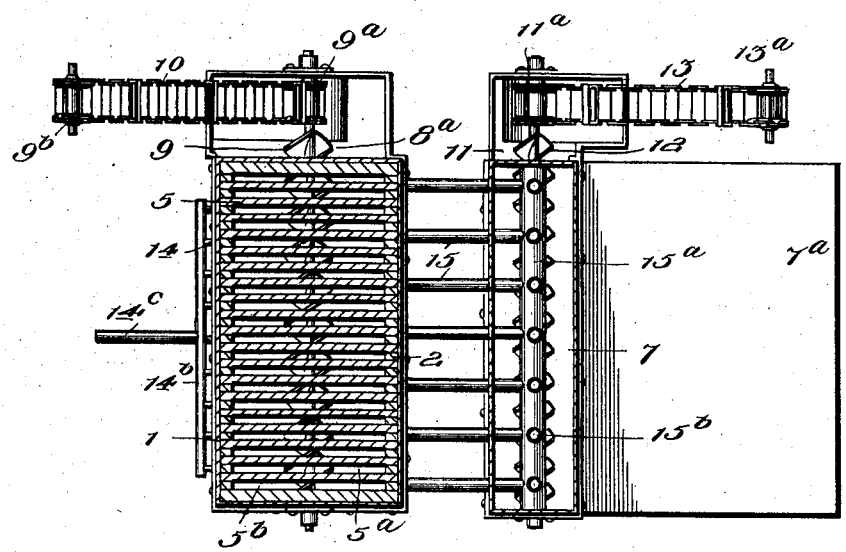
Figure 4:
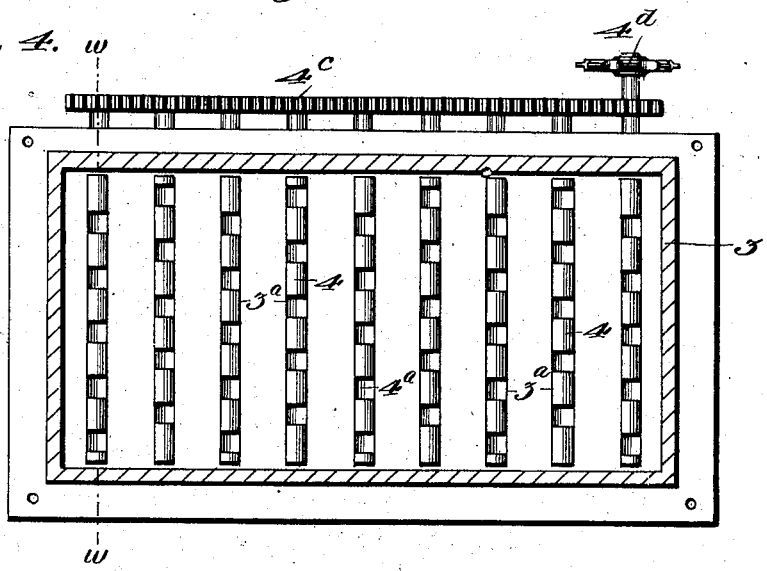

In the accompanying drawings, illustrating the preferred embodiment of my invention, Figure 1 is a sectional elevation thereof. Fig. 2 is a like section taken on the line $x\ x$ of Fig. 1. Fig. 3 is a section on the line $y\ y$ of Fig. 1. Fig. 4 is a section on the line $z\ z$ of Fig. 2. Fig. 5 is a section taken on the line $w\ w$ of Fig. 4. Fig. 6 is an enlarged broken detail view taken on the line $a\ a$ of Fig. 5. Fig. 7 is a section, on an enlarged scale, taken on the line $b\ b$ of Fig. 1.

Latitude is allowed herein as to details, as they may be changed as circumstances suggest without departing from the spirit of my invention and the same remain intact and be protected.

In carrying out my invention I provide a suitable chamber 1, preferably an iron or steel closure rectangular in general outline, with a lining 2 of some refractory material, as usually provided in such chambers. Said chamber 1 has a hopper or receptacle 3, with a plurality or series of fuel-feeding perforations or orifices $3^a$ through its bottom, and immediately below and in contact with said bottom is a plate or partition $3^b$, forming the top of said chamber and having a corresponding number of perforations or orifices $3^c$ registering with the orifices $3^a$. Said series of orifices $3^a\ 3^c$ are preferably rounded out upon their opposed edges or surfaces, thereby forming intermediate circular or cylindric seats $3^d$, the purpose of which will next be seen. A series of cylindric axially-rotatable valves 4 are arranged in the series of seats $3^d$, one valve being let into each series of alining seats and provided in their opposite or upper and lower surfaces with alternating series of cavities or recesses $4^a\ 4^b$, each thus adapted to engage or take a prescribed quantity of the fuel or carbon in a pulverulent condition from the hopper or receptacle 3 to provide for regulating the feeding of said carbon or fuel to the generator or producer, as presently made more fully apparent. Each valve therefore controls an upper and a lower series of registering orifices $3^a$ $3^c$, while the whole series of valves alternately control the passage-ways between coincident series of said orifices to effect the required or regulated feeding of the carbon or fuel. Said valves are intergeared by pinions $4^c$, one fixed to each valve, while to one of said valves is fixed, preferably, a sprocket wheel or pinion $4^d$, to which motion may be transmitted by a belt (not shown) for simultaneously actuating said valves in effecting the feeding of the carbon or fuel, or said valves may be otherwise actuated.

Within the chamber 1 are disposed a series or plurality of partitions or plates 5 5 with their upper ends arranged in direct contact with the under side of the top of said chamber and in planes intermediately of the orifices $3^c$, each two plates forming the walls of alternate vertical tubes $5^a$, with which communicates each of said orifices, also the walls of intermediate tubes $5^b$, which, however, have no direct communication with said orifices and tubes. Said tubes $5^b$ communicate at the rear or back, near or at their upper ends, with or are extended into a rearwardly-extending common tube or arm 6, in turn connecting with a common downwardly-extending conductor or closure 7, itself being preferably provided at its lower end with a rearwardly-extending arm $7^a$ for connection with suitable means for delivering the gas to other parts for the further treatment of the gas—as, for instance, a scrubber—or for use as fuel. Said plates or tubes $5^a$ each depend within the chamber 1 to a point in a common plane and yet arranged a sufficient distance above or from the bottom thereof to provide a combustion-chamber 8. The lower end of said chamber has fixed thereto, preferably as shown, a preferably tapering bottom or ash-pit $8^a$, adapted to constitute a water seal, and containing a preferably spiral or screw conveyer 9 to provide for the lateral and automatic delivery or removal of the ash. Said tapering bottom or ash-pit has a lateral extension, into which the shaft of the conveyer extends, and which shaft has fixed thereto preferably a sprocket wheel or pulley $9^a$, encompassed together with a corresponding pulley $9^b$, suitably supported by an endless belt of buckets 10, dipping into said ash-pit extension and elevating the ashes to a suitable point out of the way. A similar water-sealed ash-pit 11 is supplied to the arm or extension $7^a$ in alinement with the conductor or closure 7 to receive any precipitated ash which may be carried over with the gas and falling through said conductor. Also a like spiral or screw conveyer 12 is arranged in said ash-pit 11, with a sprocket pinion or pulley $11^a$ fixed to its shaft and arranged in a lateral extension of said ash-pit, an endless belt of buckets 13 encompassing said pulley, also a second pinion or pulley $13^a$, suitably supported in position, elevating or removing the ash from said ash-pit.

In order to effect the initial heating of the retort or generator 1, burner-tubes 14 are preferably provided, projecting through one side of the combustion-chamber and thereinto and connecting at their outer ends with a common head-pipe $14^b$, in turn connecting with a pipe $14^c$, leading from a supply of hydrocarbon or other combustible fluid, the ignition of said hydrocarbon or fluid at the burner ends of said burners generating heat in said combustion-chamber for heating the plates or walls of the tubes $5^a$ $5^b$.

For delivering or supplying air to the combustion-chamber of the generator or retort I provide a series of pipes 15, with one end of each communicating with said chamber, about in alinement with or opposite the burner-tubes 14 and preferably connected to a common transverse pipe $15^a$. Said last-referred-to pipe has connected to it a series of vertical pipes $15^b$, in turn preferably connected to a second common transverse pipe $15^c$, and into this pipe delivers or discharges a single vertical pipe 16, leading from a blast-fan or generator 17 of ordinary or other construction, suitably arranged or supported in position.

The combustion-chamber having been "fired" or heated, as above pointed out, fuel or carbon, preferably supplied to the hopper, is delivered or dropped by suitably actuating the carbon or fuel delivery valves 4 into the tubes $5^a$. When the combustion-chamber and the various tubes $5^a$ $5^b$ have been heated sufficiently to insure the ignition of the pulverulent fuel or carbon, the last named is fed slowly into the tubes $5^a$, accompanied with a considerable excess of air from the fan 17 to such extent as to produce complete combustion, which of course will aid in further raising the temperature of the retort or generator. When the greater portion of the lining is incandescent, the initial heating action is cut off and the required temperature maintained thereafter by the "gasification" heat. At this stage the feeding of the fuel or carbon is increased rather rapidly or the air-supply correspondingly diminished to bring about the relative proportional feeding thereof according to the demand made upon the apparatus. The fuel in the hopper is maintained at a depth practically preventing leakage of gas. The fuel as it is fed into the tubes $5^a$ enters or drops thereinto shower-like and becomes highly heated and is in a condition for practically instantaneous combustion when reaching the combustion-chamber. When the air-supply is not sufficient to complete combustion, the process is that of gasification, only about one-third of the caloric value of the fuel being released and the remainder being retained for future use in the gas. It is essential that the air-supply be preheated, which is effected, as above noted, by subjecting its conducting-pipe to the action of the hot gases. It is also noted that anthracite or hard coal can be employed, as well as bituminous coal and lignites, in the formation of gas in my apparatus, said coal of course being reduced or pulverized to the required fineness.

What I claim as new, and desire to secure by Letters Patent, is—

1. In a gas producer or generator, the combination of a fuel receptacle or hopper, a plurality of vertical flues, tubes, or passages arranged to receive fuel from said hopper, means for controlling the rate of feeding fuel from said hopper into said fuel-flues, a combustion-chamber into which the lower ends of said fuel-flues deliver, and uptake flues or passages leading from said combustion-chamber and alternating with said fuel-flues.

2. The combination of a fuel-hopper, a combustion-chamber, a plurality of fuel-flues connecting said hopper to said combustion-chamber and passages substantially enveloping each of said fuel-flues and arranged to convey hot gases from said chamber to a conductor in such manner as to heat said fuel-flues.

3. The combination of a fuel-hopper with a plurality of vertical fuel-flues, a combustion-chamber into which said fuel-flues lead, said fuel-flues being separated each from the other by spaces or passages traversed by hot gases from the combustion-chamber, and so grouped as to deliver fuel from the hopper with substantial uniformity over the entire horizontal area of said combustion-chamber.

4. The combination, within containing-walls, of a series of vertical tubes or flues arranged over, and opening into, a combustion-chamber, means for regularly feeding fuel through said tubes or flues having arranged therebetween spaces or passages for the upward passage of hot gases from said chamber, means for regularly passing a current of air through said chamber, and a water-sealed ash-pit at the bottom of said chamber.

5. The combination of a fuel receptacle or hopper, a combustion-chamber, a plurality of fuel-flues connecting with said hopper and delivering into said chamber, a series of mechanically-actuated valves arranged to control or regulate the feeding of fuel from said hopper into said fuel-flues, and exit flues or passages, alternating with or enveloping said fuel-flues, adapted to convey hot gases from said combustion-chamber.

6. The combination of a fuel-hopper with a plurality of open-ended fuel-flues, a plurality of intergeared valves common to said hopper and flues, and arranged to control the delivery of fuel into said flues, substantially as set forth.

7. The combination of a fuel receptacle or hopper, a chamber having a plurality of open-ended fuel-flues, a plurality of axially-actuated valves common to said hopper and flues, and arranged to control the delivery of fuel into said flues, substantially as set forth.

8. The combination of a fuel receptacle or hopper, a generator having an open-ended fuel-flue, with an axially-actuated valve having on opposite sides series of alternating cavities or recesses for feeding fuel into said fuel-flue, substantially as set forth.

9. The combination of a fuel receptacle or hopper, a generator having a plurality of fuel-flues, and a plurality of mechanically-actuated cylindric valves having series of alternating cavities or recesses on opposite sides for delivering fuel to said fuel-flues, substantially as set forth.

10. The combination of a fuel receptacle or hopper, a chamber having a plurality of open-ended fuel-flues, and a plurality of registering openings or orifices having intermediate seats, and a plurality of cylindric axially-actuating valves, common to said hopper and flues, arranged in said seats and connected up for simultaneous mechanical action, substantially as set forth.

11. The combination of a series of fuel-flues alternating with and substantially enveloped by gas-exit flues or passages, a combustion-chamber common to all of said fuel-flues and gas-exit flues, a gas-conducting passage or chamber, connected with said gas-exit flues, and an air-supply pipe extending through said gas-conducting passage to said combustion-chamber.

12. In a gas-generator, the combination of a chamber having its upper portion subdivided by a series of spaced-apart plates into numerous passages or flues opening into the lower portion of said chamber, means for feeding fuel into said lower portion of said chamber through each alternating one of said passages or flues, and means for conducting gases through each of the other of said passages or flues from said lower chamber.

13. The combination of a series of fuel-flues alternating with, and enveloped by, gas-exit flues or passages, a combustion-chamber common to all of said fuel and gas-exit flues, a conductor communicating with said gas-exit flues, means for feeding fuel into said fuel-flues, and a burner-nozzle delivering into said combustion-chamber.

14. The combination of a fuel receptacle or hopper, a retort having a plurality of open-ended compartments or tubes, a plurality of companion compartments or tubes, a combustion-chamber arranged below said compartments or tubes, a common conductor communicating with the last-referred-to tubes or compartments at their upper ends, a burner-tube communicating with said combustion-chamber, and means for feeding the fuel into the first-referred-to compartment or tubes, substantially as set forth.

15. The combination of a retort having a plurality of open-ended compartments or tubes, a plurality of companion tubes opening near their upper ends, at the rear, a conductor connecting with the last-referred-to tubes or compartments and having connection with a vertical closure conducting away the hot gases, and an air-supply pipe adapted to deliver into the combustion-chamber of said retort and extending through said closure for conducting away the hot gases, substantially as set forth.

16. The combination of a series of vertical tubes or flues arranged over and opening into a combustion-chamber, means for regularly feeding fuel into said tubes or flues, tubes or flues alternating with the first-referred-to tubes or flues and having closed upper ends, and adapted to communicate with an outlet, below said closed upper ends for the upward passage of hot gases from the combustion-chamber, means for regularly passing a current of air through said chamber; and a water-sealed ash-pit at the bottom of said chamber.

17. The combination of a series of vertical tubes or flues arranged over and opening into a combustion-chamber, means for regularly feeding fuel into said tubes or flues, tubes or flues alternating with |the first-referred-to tubes or flues and having closed upper ends, and adapted to communicate with an outlet, below said closed upper ends for the upward passage of hot gases from the combustion-chamber, means for regularly passing a current of air through said chamber, and a water-sealed ash-pit at the bottom of said chamber, with mechanical means for removing ashes therefrom, substantially as set forth.

In testimony whereof I affix my signature in presence of two witnesses.

WILLIAM F. MATTES.

Witnesses:
　WALTER L. DECKER,
　CHAS. C. MATTES.